United States Patent

[11] 3,589,190

| | | |
|---|---|---|
| [72] | Inventor | William C. Jones<br>16 W. 328 Walnut Lane, Tiber Trails,<br>Elmhurst, Ill. 60126 |
| [21] | Appl. No. | 739,000 |
| [22] | Filed | June 21, 1968 |
| [45] | Patented | June 29, 1971 |

[54] RESPIRATION TESTING APPARATUS
5 Claims, 7 Drawing Figs.

[52] U.S. Cl. ..................................... 73/279,
73/262, 73/410, 128/2.08
[51] Int. Cl. ...................................... A61b 5/08
[50] Field of Search ............................ 128/2.08,
2.07; 73/262, 272, 263, 264, 410, 268, 269, 278,
279; 407/46, 40; 92/34, 89, 87

[56] References Cited
UNITED STATES PATENTS

| 3,395,699 | 8/1968 | Beasley | 128/2.08 |
| 3,467,078 | 9/1969 | Bird et al. | 128/2.08 |
| 2,709,430 | 5/1955 | Traugott | 128/2.07 |
| 2,933,082 | 4/1960 | Billin | 128/2.07 |
| 3,086,515 | 4/1963 | Jones | 128/2.08 |
| 356,997 | 2/1887 | Gil | 73/279 |

Primary Examiner—James J. Gill
Assistant Examiner—Marvin Smollar
Attorney—Dawson, Tilton, Fallon & Lungmus ABSTRACT: A respiration testing apparatus suitable for use in pulmonary function analysis. The apparatus includes an outer casing and a horizontal bellows which has a fixed end plate secured to the casing and a movable end plate supported by an elongated, horizontally extending rod which passes through the center of the movable end plate and is secured thereto. A breathing tube extends through the casing and the stationary end plate into the bellows. The support rod is slidably supported for horizontal movement by a pair of rollers, one of which is rotatably mounted on the casing adjacent one end of the rod and the other end of the rod. The first end of the rod carries a stylus which describes a recording chart to record movement of the rod and the bellows as air is drawn into and removed from the bellows through the breathing tube.

PATENTED JUN29 1971 3,589,190
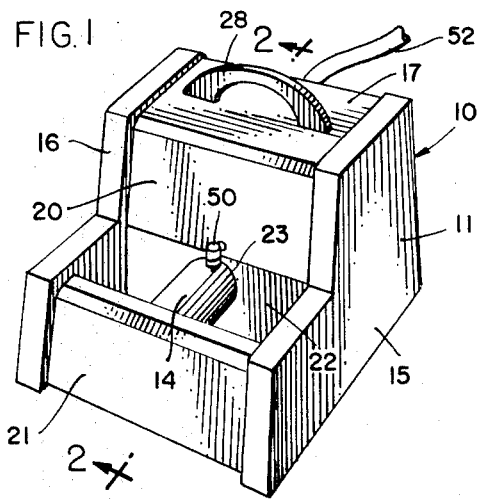
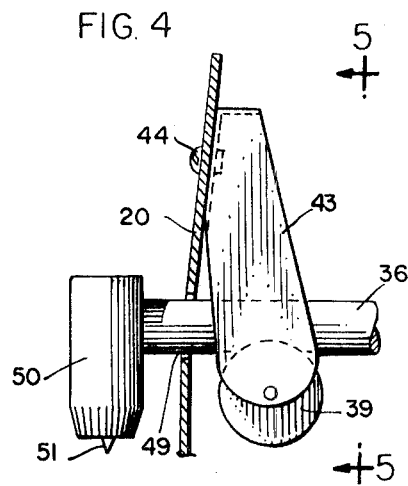
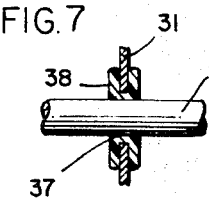
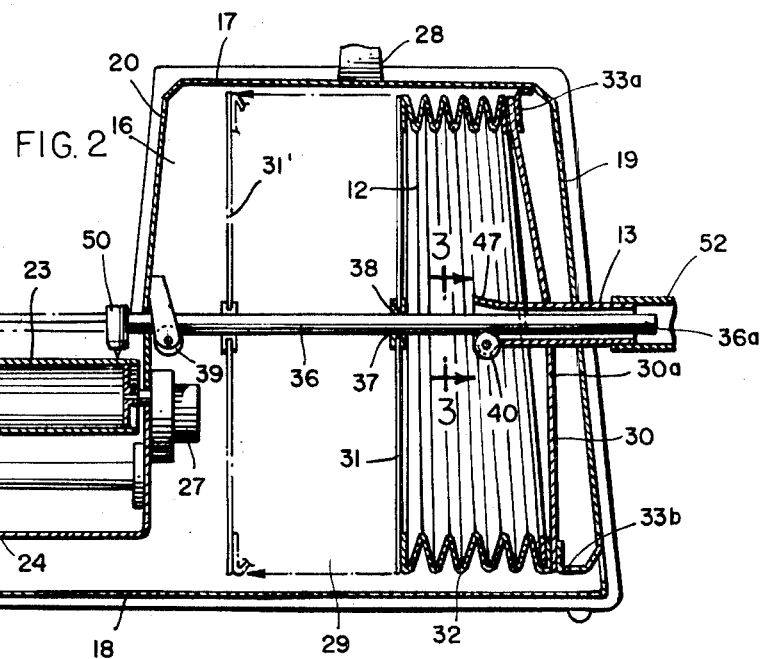
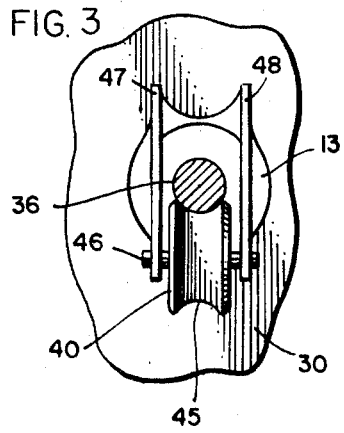
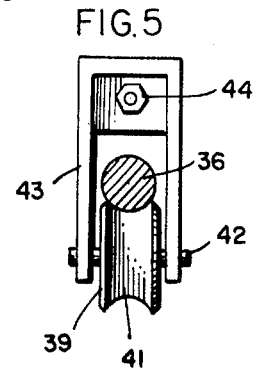
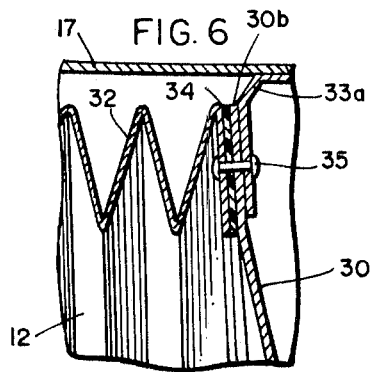
INVENTOR:
WILLIAM C. JONES
BY
Dawson, Tilton, Falloy & Lungmus
ATT'YS

RESPIRATION TESTING APPARATUS

BACKGROUND

Pulmonary function testing equipment ordinarily consists of an inverted canister supported for vertical movement while partially immersed a body of liquid such as water. As a subject breathes into the canister, the expired air fills the space therein above the water level and the extent of upward movement of the canister depends upon the volume of air contained therein, the breathing characteristics of a subject may be graphically represented by plotting the changes in position of the canister over a given period of time.

While the use of water or a liquid in such an apparatus is in one sense desireable because of the low frictional resistance to canister movement, this advantage is more than offset by the disadvantages or defects inherent in a liquid-containing apparatus. For instance, as the canister moves there is ordinarily a variance between the inside and outside liquid levels and this "manometer effect" necessarily imparts considerable inaccuracy in the results of volumetric tests. A bouncing action of the canister may occur and, because of the manometer effect, there may be considerable overshooting and undershooting of the canister at the limits of its range of movement. Further inaccuracy may occur because of the solubility of the gas in the body of liquid.

Because of the foregoing disadvantages, it is desirable to provide a pulmonary function testing apparatus which does not utilize liquid. One such apparatus is described in my prior patent, U.S. Pat. No. 3,086,515, issued Apr. 23, 1963, which utilizes a bellows which expands and contracts in a generally horizontal direction. It is advantageous to provide a horizontal bellows rather than a vertical bellows since in the latter case, in order for the bellows to expand, the pressure of the air entering the bellows must overcome the weight of the bellows.

Some attempts have been made to provide a horizontally movable bellows by supporting the movable end plate of the bellows adjacent the top thereof by means of tracks, rollers, and the like. Problems have arisen, however, with such devices. For example, the lower end of the bellows, which is not supported, tends to expand before the upper end of the bellows, which is restrained somewhat by the inertia of the supporting means. Not only does this result in uneven expansion of the bellows and inaccurate recording, but, when the inertia of the supporting means is overcome, the upper end of the bellows will attempt to "catch up" with the lower end, resulting in quivering or bouncing of the bellows and further inaccuracies in recording.

Others have supported the movable end plate either at the top or bottom for pivotal movement about a fixed point as air is forced into the bellows. However, this results in difficulties and inaccuracies in measuring the volume of air which enters and leaves the bellows since the arcuate movement of the end plate is not directly proportional to the volume of air entering or leaving the bellows. Such a bellow also must expand more than a horizontal bellows because a pivotable end plate must move farther than a vertical end plate to accommodate the same volume of air. In order to decrease inaccuracies, the distance between the end plate and pivot point can be lengthened to increase the radius of the arc through which the end plate moves, but this results in a relatively large and bulky apparatus.

SUMMARY

The inventive testing apparatus is extremely compact and includes a horizontal bellows having a movable end plate which is maintained in a generally vertical plane as the bellows expands and contracts. The volume of air entering and leaving the bellows can thereby be accurately measured by measuring the horizontal movement of the end plate. The movable end plate is supported centrally thereof by a horizontally extending, slidably supported rod, and quivering and bouncing of the bellows is eliminated. The stylus means for scribing the recording chart is connected directly to the support rod, and the apparatus provides an extremely accurate recording of the breathing characteristics of the subject.

DESCRIPTION OF THE DRAWING

FIG. 1 is a perspective view of a respiration testing device embodying the present invention;

FIG. 2 is an enlarged sectional view taken along the line 2-2 of FIG. 1;

FIG. 3 is an enlarged fragmentary sectional view taken along the line 3-3 of FIG. 2;

FIG. 4 is an enlarged fragmentary view of a portion of FIG. 2;

FIG. 5 is a view taken along the line 5-5 of FIG. 4;

FIG. 6 is an enlarged fragmentary view of a portion of FIG. 2; and

FIG. 7 is an enlarged fragmentary view of a portion of FIG. 2.

DESCRIPTION OF SPECIFIC EMBODIMENT

Referring now to FIGS. 1 and 2, the numeral 10 designates generally a respiration testing device having an outer casing 11, a bellows 12 within the casing, a breathing tube 13 communicating with the bellows, and recording means 14 secured to the casing and operatively associated with the bellows for recording the expansions and contractions thereof.

The casing 11 includes sidewalls 15 and 16, top wall 17, bottom wall 18 and rear wall 19. The front of the casing is closed by first and second front walls 20 and 21, which are spaced apart to provide a recess or well 22 which receives a cylindrical recording chart 23 provided as part of the recording means 14. The bottom of the well 22 is formed by a wall 24 which extends forwardly from the first front wall 20 and a wall 25 which extends upwardly to the second front wall 21. Advantageously, the walls 21 and 25 are spaced apart a sufficient distance to accommodate an electric motor 26 which may be mounted on the wall 25 to rotate the chart 23 at a particular speed. If desired, a second motor 27 may be mounted on the front wall 20 to rotate the chart at a different speed. The recording chart and the drive motors 26 and 27 are conventional, and it is believed unnecessary to give a detailed description herein. Although the particular recording chart 23 illustrated is cylindrical, other forms of charts may be used.

The apparatus 10 is relatively compact, having length between front wall 21 and rear wall 19 of less than 2 feet, a width of the order of 1 foot, and a height from bottom wall to top wall of about 1 foot. The apparatus is also relatively light, weighing less than 20 pounds, and a handle 28 may be attached to the top wall 17 for carrying the apparatus from one place to another.

Bellows 12 is oriented for horizontal expansion and contraction within chamber 29 provided by the casing and consists essentially of generally vertically extending end plates 30 and 31 and an accordion-pleated body 32 formed of rubber or any other suitable nonporous and flexible sheet material. End plate 30 is somewhat dish-shaped, having a rearwardly extending central portion 30a (FIG. 6) which forms a rectangular attaching frame for the bellows body. The end plate 30 is held in a stationary position by upper and lower supporting brackets 33a and 33b, respectively, which extend forwardly from the rear wall 19 of the casing, and by breathing tube 13 which extends through both the rear wall 19 and the center of the end plate 30. An airtight connection is provided between the breathing tube and the stationary end plate, as by silver soldering.

Referring to FIG. 6, a perimetrically extending gasket 34 of rubber or other suitable material is interposed between the flat edge portion 30b of the stationary end plate 30 and the pleated body 32 of the bellows to maintain an airtight seal therebetween, and the bellows and end plate are joined by rivets 35 which are spaced around the edge of the end plate. The rivets 35 which are spaced around the edge of the end plate. The rivets 35 along the top and bottom of the end plate may also be used to secure the end plate and bellows to the brackets 33a and 33b, as illustrated in FIG. 6, or the end plate may be secured to the brackets by other means, as by silver soldering.

Bellows end plate 31 is movable and is supported by horizontally extending metal support rod 36. The support rod 36 passes through a central opening 37 provided in the rectangular end plate 31 and is fixed to the end plate by means of rubber grommet 38 which also provides an airtight seal between the end plate and the rod (FIG. 7). The grommet 38 frictionally engages the rod 36 so that the rod and end plate 31 move together. The bellows body 32 is secured to the movable end plate in a manner similar to that heretofore described with respect to the stationary end plate, and the bellows is generally rectangular in vertical cross section.

The rod 36 is supported for horizontal sliding movement by a pair of rollers 39 and 40, which may advantageously be made of nylon. Referring to FIGS. 4 and 5, forward roller 39 is provided with an annular groove 41 which receives the rod 36, and the roller is rotatably carried by pin 42 which is supported by a generally U-shaped bracket 43 secured to the front wall 20 by screw 44. Roller 40 is similarly provided with an annular groove 45 and is rotatably supported by pin 46. Referring to FIGS. 2 and 3, the forward or inner end of the breathing tube 13 is slit in a vertical plane, and the slit end of the tube is flattened to provide a pair of spaced-apart relatively flat ends 47 and 48 which support the roller pin 46.

The forward end of the rod 36 extends through an opening 49 (FIG. 4) provided in the front wall 20 and carries a conventional stylus 50 having a scribing point 51. When the bellows is in the neutral or equilibrium position illustrated in FIG. 2, the rearward end 36a of the support rod extends axially within the breathing tube 13, thereby permitting the length of the casing 11 to be reduced. If desired, however, the rearward end of the rod could be positioned forwardly of the stationary end plate when in the neutral position, and the roller 40 could be supported by a suitable bracket extending forwardly from the stationary end plate. In this event the bellows would be designed so that the movable end plate would have a neutral position to the left of that illustrated in FIG. 2.

When the apparatus is to be used, a flexible hose 52 may be slipped over the outer end of the breathing tube 13 and suitably connected to the patient whose pulmonary characteristics are to be measured. As the patient expires into the tube 52 and air passes through the breathing tube 13 into the interior of the bellows 12, the movable end plate 31 moves forwardly, or to the left as viewed in FIG. 2. The supporting rod 36 is secured to the end plate 31 by the grommet 38, and also moves forwardly over the rollers 39 and 40. The stylus 50 records the movement of the rod 36 and the movable end plate on the recording chart 23, which is being slowly rotated by either of the electric motors 26 or 27. At the end of a maximum expiration, the movable end plate 31 may have moved to the position indicated at 31' in FIG. 2, and the length of the rod 36 is such that the rearward end 36a will still be supported by the roller 40.

Similarly, as the patient inspires and air is withdrawn from the bellows through the breathing tube 13, the bellows contracts. The movable end plate 31 and its support rod 36 move rearwardly, or to the left, and this movement is also recorded on the chart 23 by the stylus.

The bellows is generally rectangular in vertical cross section, and the rectangular end plate 31, which is supported centrally by the rod 36, is always maintained in a substantially vertical plane. The increase or decrease in volume of the bellows caused by the expirations and inspirations of the patient is therefore directly proportional to the horizontal movement of the end plate 31 and its support rod 36. The recording means 14 accurately records this horizontal movement and gives an accurate determination of the pulmonary characteristics of the patient. The central support for the movable end plate also substantially eliminates any tendency of the bellows to quiver as it expands or contracts. The movable end plate need not overcome the inertia of supporting means at the top or bottom of the bellows, and the end plate always moves uniformly.

If desired, the apparatus may be provided with spring means such as disclosed in my prior patent, U.S. Pat. No. 3,086,515, for counteracting the resistance of the bellows to expansion and contraction.

While in the foregoing specification I have described a specific embodiment of my invention in considerable detail for the purpose of illustration, it will be understood by those skilled in the art that many of the details herein given may be varied considerably without departing from the spirit and scope of my invention.

I claim:

1. In a respiration testing device, an outer casing, a horizontal bellows in said casing, said bellows having a stationary end plate secured to said casing and a movable end plate, a breathing tube extending through said casing and said stationary end plate, an elongated horizontally extending support rod passing through the approximate center of said movable end plate and secured thereto for movement therewith, first support means fixed to said stationary end plate at approximately the center thereof for slidably supporting one end of said rod, and second support means attached to said casing on substantially the same horizontal axis as the first support means for slidably supporting the other end of said rod whereby said bellows may expand and contract evenly as air is drawn into and removed from the bellows through the breathing tube.

2. The structure of claim 1 in which said breathing tube extends through the approximate center of said stationary end plate, said first support means including a roller rotatably secured to the breathing tube, said rod passing over the roller and into the breathing tube.

3. The structure of claim 1 including recording means carried by said casing and stylus means carried by said other end of said support rod, said stylus means scribing said recording means as said bellows contracts and expands.

4. In a respiration testing device, an outer casing, a horizontal bellows in said casing, said bellows being generally rectangular in vertical cross section and having a stationary end plate secured to said casing and a generally rectangular movable end plate, a breathing tube extending through said casing and said stationary end plate, said breathing tube extending generally through the center of the stationary end plate, an elongated generally horizontally extending support rod passing through the center of said movable end plate and secured thereto, a first stroller rotatably mounted on said casing and supporting said support rod adjacent one end thereof, a second roller rotatably secured to said breathing tube on substantially the same horizontal axis as the first roller and supporting said support rod adjacent the other end thereof, said rod passing over the second roller and into the breathing tube, recording means operatively connected to said one rod end for recording the movement thereof as air is drawn into and removed from said bellows, the other end of the rod moving axially within the breathing tube as the bellows expands and contracts and the movable end plate being maintained in a generally perpendicular plane as the bellows expands and contracts.

5. The structure of claim 4 wherein said recording means includes a stylus carried by said one rod end and a recording chart mounted on said casing.

UNITED STATES PATENT OFFICE
CERTIFICATE OF CORRECTION

Patent No. 3,589,190        Dated June 29, 1971

Inventor(s) William C. Jones

It is certified that error appears in the above-identified patent and that said Letters Patent are hereby corrected as shown below:

In claim 4, line 53, "stroller" should be --roller--.

Signed and sealed this 30th day of November 1971.

(SEAL)
Attest:

EDWARD M. FLETCHER, JR.        ROBERT GOTTSCHALK
Attesting Officer        Acting Commissioner of Patents